United States Patent
Ozu

(10) Patent No.: US 7,499,461 B2
(45) Date of Patent: Mar. 3, 2009

(54) GATEWAY APPARATUS

(75) Inventor: Toshihisa Ozu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 722 days.

(21) Appl. No.: 10/936,584

(22) Filed: Sep. 9, 2004

(65) Prior Publication Data

US 2005/0254504 A1 Nov. 17, 2005

(30) Foreign Application Priority Data

May 14, 2004 (JP) .............................. 2004-145295

(51) Int. Cl.
*H04L 12/28* (2006.01)
(52) U.S. Cl. ...................... 370/401; 370/356
(58) Field of Classification Search ................. 370/356, 370/401, 395.21, 352; 379/90.01
See application file for complete search history.

(56) References Cited

U.S. PATENT DOCUMENTS

| | | | | |
|---|---|---|---|---|
| 6,891,827 B2 * | 5/2005 | Cho | ........................... | 370/356 |
| 7,272,135 B1 * | 9/2007 | Ohtsu et al. | ................. | 370/356 |
| 2002/0080930 A1 * | 6/2002 | Cho | ........................ | 379/90.01 |
| 2003/0118039 A1 * | 6/2003 | Nishi et al. | ................. | 370/401 |
| 2005/0226250 A1 * | 10/2005 | Makayama et al. | .... | 370/395.21 |

FOREIGN PATENT DOCUMENTS

| | | |
|---|---|---|
| JP | 2002-290460 | 10/2002 |
| JP | 2002-290550 | 10/2002 |

* cited by examiner

*Primary Examiner*—Hassan Kizou
*Assistant Examiner*—Emmanuel Maglo
(74) *Attorney, Agent, or Firm*—Oblon, Spivak, McClelland, Maier & Neustadt, P.C.

(57) ABSTRACT

When a device alarm is raised in a signal processing unit 104 of a gateway apparatus 100, a transmit CH-AIS data generating unit 109 generates CH-AIS data including alarm information provided on a trunk-channel by trunk-channel basis, a packet assembling unit 105 packetizes the generated CH-AIS data into CH-AIS packets and transmits them to another gateway apparatus 100 which is disposed opposite to the gateway apparatus 100. The other gateway apparatus 100 then analyzes the CH-AIS packets received thereby by using a received CH-AIS data analysis unit 110, and notifies AIS provided on a trunk-channel by trunk-channel basis to an exchange thereof via an AIS trunk output unit 101.

2 Claims, 3 Drawing Sheets

FIG.3

| BYTE \ BIT | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| +00h | TS15 | TS14 | TS13 | TS12 | TS11 | TS10 | TS9 | TS8 | TS7 | TS6 | TS5 | TS4 | TS3 | TS2 | TS1 | — | AIS OF TRUNK CHANNEL 1 |
| +02h | TS31 | TS30 | TS29 | TS28 | TS27 | TS26 | TS25 | TS24 | TS23 | TS22 | TS21 | TS20 | TS19 | TS18 | TS17 | TS16 | |
| +04h | TS15 | TS14 | TS13 | TS12 | TS11 | TS10 | TS9 | TS8 | TS7 | TS6 | TS5 | TS4 | TS3 | TS2 | TS1 | — | AIS OF TRUNK CHANNEL 2 |
| +06h | TS31 | TS30 | TS29 | TS28 | TS27 | TS26 | TS25 | TS24 | TS23 | TS22 | TS21 | TS20 | TS19 | TS18 | TS17 | TS16 | |
| ...... | | | | | | | | | | | | | | | | | |

TSn: TIME SLOT

GATEWAY APPARATUS

BACKGROUND OF THE INVENTION

1. Field of the Invention

The present invention relates to a gateway apparatus for interfacing between an exchange and an IP network.

2. Description of Related Art

Conventionally, various technologies have been proposed for monitoring whether a failure occurs in a gateway apparatus that connects an IP (Internet Protocol) network with a PSTN network (Public Switched Telephone Network).

For example, in prior art gateway apparatus disclosed by patent reference 1, a VoIP (Voice over Internet Protocol) gateway apparatus on a transmit side monitors whether a failure occurs in an IP network, generates a status report signal including monitoring results, and periodically transmits it to another VoIP gateway apparatus, which is the party at the other end of communications, via a voice communication path. Then, when the VoIP gateway apparatus does not receive a status report signal from the party at the other end of communications within a predetermined time period, the VoIP gateway apparatus determines that a failure has occurred in the voice communication path and performs a disconnection process of disconnecting a corresponding call.

A prior art voice gateway apparatus disclosed by patent reference 2 periodically checks failure information about each of two or more voice gateway apparatus which can be the party at the other end of communications, and stores it in a status management table. The prior art voice gateway apparatus then refers to the status management table when transmitting data to the party at the other end of communications, and controls so as not to select any voice gateway apparatus in which a failure has occurred as the party at the other end of communications, thereby shortening the length of time that the call is connected.

[Patent reference 1] Japanese patent application publication (TOKKAI) No. 2002-290460

[Patent reference 2] Japanese patent application publication (TOKKAI) No. 2002-290550

A problem with prior art gateway apparatus is that when a failure occurs in a piece of hardware corresponding to a trunk channel of the gateway apparatus, no components of the gateway apparatus notify the occurrence of the failure to another gateway apparatus which is the party at the other end of communications, and therefore call blockage occurs in the trunk channel in which the failure has occurred.

Another problem with the prior art gateway apparatus is that no components notify the occurrence of a failure that has occurred on a PSTN side to a station which is disposed opposite to the prior art gateway apparatus.

SUMMARY OF THE INVENTION

The present invention is made in order to solve the above-mentioned problems, and it is therefore an object of the present invention to provide a gateway apparatus that can notify indicating the occurrence of a failure on a channel by channel basis to a station which is disposed opposite to the gateway apparatus.

In accordance with the present invention, there is provided a gateway apparatus that is disposed opposite to another gateway apparatus on an IP network, for interfacing between an exchange and the IP network, the gateway apparatus including: a plurality of signal processing units that are disposed for a plurality of channels thereof, respectively, each for performing data processing on data transmitted via a corresponding one of the plurality of channels; a device alarm monitoring control unit for monitoring occurrence of a failure in the plurality of signal processing units; a failure-occurrence-data generating unit for generating failure occurrence data for a channel corresponding to one of the plurality of signal processing units which a failure has occurred based on failure occurrence information notified thereto by the device alarm monitoring control unit; a packet assembling unit for packetizing the failure occurrence data so as to generate failure occurrence packet data; a packet transmitting unit for transmitting the failure occurrence packet data generated by the packet assembling unit to the other gateway apparatus which is disposed opposite to the gateway apparatus; a packet receiving unit for receiving failure occurrence packet data transmitted thereto from the other gateway apparatus which is disposed opposite to the gateway apparatus; a packet disassembling unit for disassembling the failure occurrence packet data received by the packet receiving unit so as to extract failure occurrence data; a failure-occurrence-data analysis unit for analyzing the failure occurrence data extracted by the packet disassembling unit so as to determine if a channel of the other gateway apparatus in which a failure has occurred corresponds to which channel of the gateway apparatus; and a failure occurrence information output unit for notifying failure occurrence information provided on a channel by channel basis to a local station side based on an analysis result obtained by the failure-occurrence-data analysis unit.

According to the present invention, when a device alarm is raised in such a component as a DSP of the gateway apparatus, the gateway apparatus generates packets including alarm information provided on a trunk-channel by trunk-channel basis and transmits them to another gateway apparatus which is a station disposed opposite to the gateway apparatus, and the other gateway apparatus notifies the alarm information provided on a trunk-channel by trunk-channel basis to the PSTN side. Thus, the gateway apparatus of the present invention can notify the alarm information which is provided on a trunk-channel by trunk-channel basis to the other station disposed opposite to the gateway apparatus.

Further objects and advantages of the present invention will be apparent from the following description of the preferred embodiments of the invention as illustrated in the accompanying drawings.

BRIEF DESCRIPTION OF THE DRAWINGS

FIG. 3 is a diagram showing the structure of payloads of CH-AIS packets in accordance with embodiment 1 of the present invention.

DETAILED DESCRIPTION OF THE PREFERRED EMBODIMENTS

The preferred embodiments of the present invention will be explained hereafter.

Embodiment 1

Figure 1:
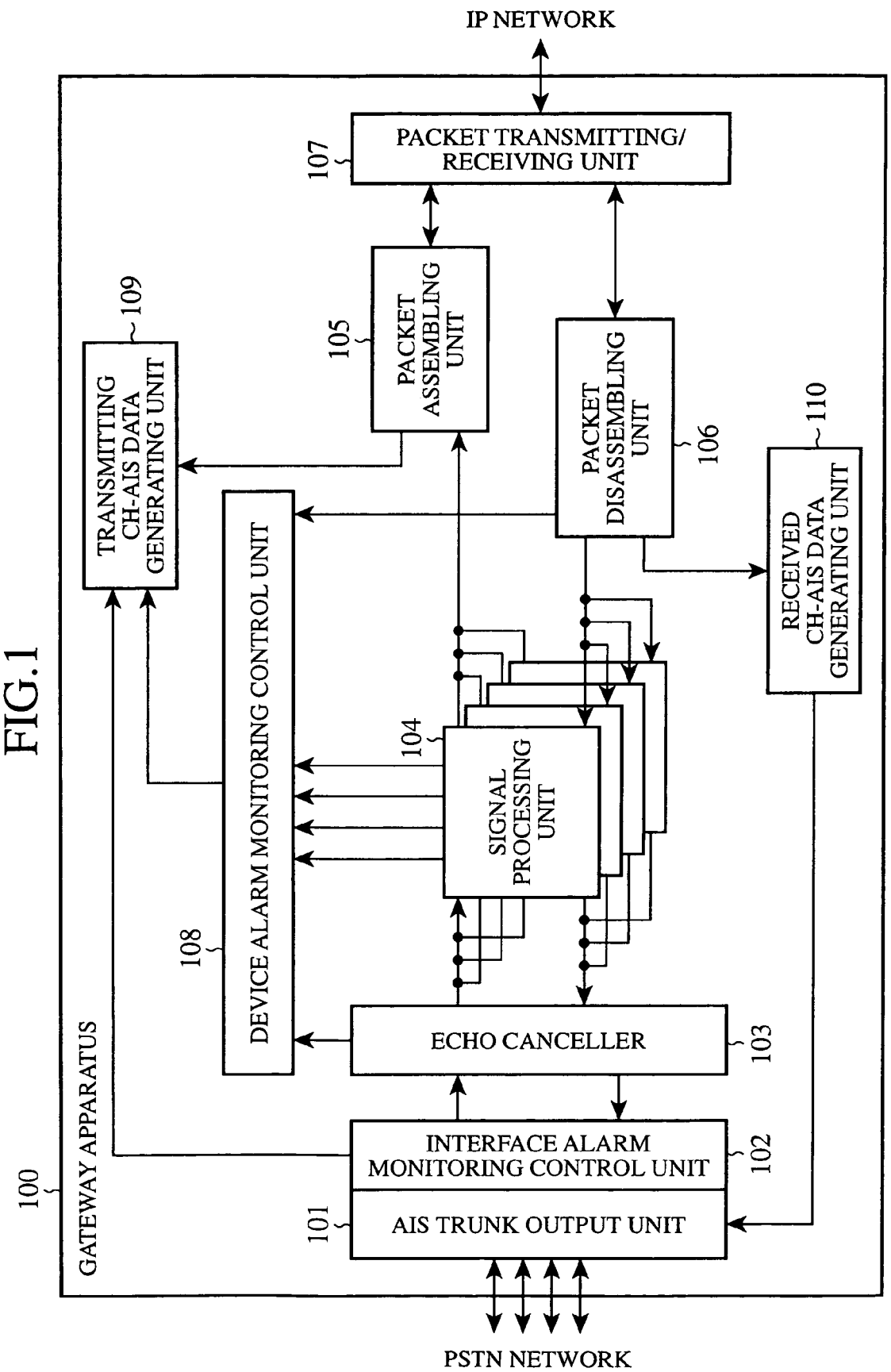
FIG. 1 is a block diagram showing the structure of a gateway apparatus according to embodiment 1 of the present invention.

FIG. 1 is a block diagram showing the structure of a gateway apparatus 100 according to embodiment 1 of the present invention. The gateway apparatus 100 connects a PSTN network with an IP network, and is so disposed as to be opposite to another gateway apparatus that connects the IP network with another PSTN network which is the party at the other end of communications. As shown in the figure, the gateway apparatus 100 is provided with an AIS trunk output unit (i.e., a failure occurrence information output unit) 101, an interface alarm monitoring control unit 102, an echo canceller 103, a signal processing unit 104, a packet assembling unit 105, a packet disassembling unit 106, a packet transmitting/receiving unit (i.e., a packet transmitting unit and a packet receiving unit) 107, a device alarm monitoring control unit 108, a transmit CH-AIS data generating unit (i.e., a failure-occurrence-data generating unit) 109, and a received CH-AIS data analysis unit (i.e., a failure-occurrence-data analysis unit) 110. The signal processing unit 104 is such a device as a DSP (Digital Signal Processor) chip. The signal processing unit 104 is disposed for each of trunk channels of an interface of the gateway apparatus 100 with an exchange of the PSTN network. A failure may occur in each of the plurality of signal processing units 104 and can have an influence upon only a corresponding trunk channel of the interface.

Figure 2:
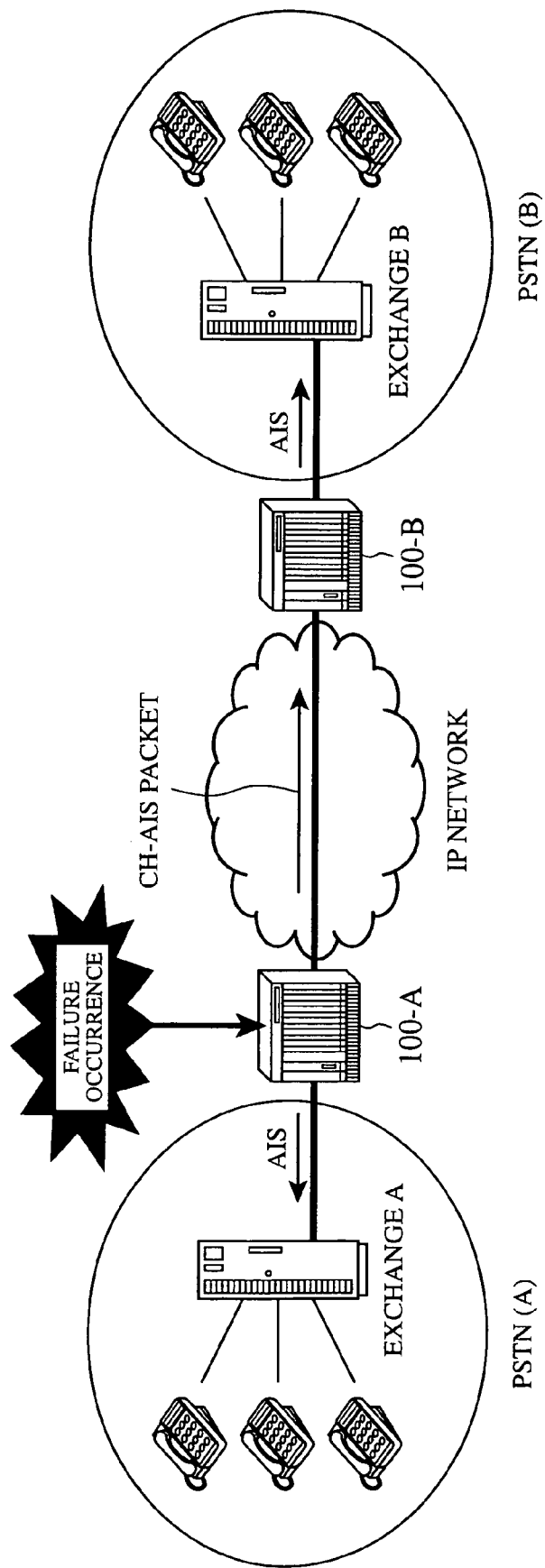
FIG. 2 is a diagram explaining operation of the gateway apparatus according to embodiment 1 of the present invention.

Next, the operation of the gateway apparatus in accordance with embodiment 1 of the present invention will be explained. FIG. 2 is a diagram explaining the operation of the gateway apparatus 100 according to embodiment 1. As shown in the figure, a gateway apparatus 100-A according to embodiment 1 is connected with an exchange A of a PSTN network (A), and another gateway apparatus 100-B according to embodiment 1 is connected with an exchange B of another PSTN network (B) which is opposite to the PSTN network (A). The gateway apparatus 100-A and the other gateway apparatus 100-B are connected to each other via an IP network.

When a failure, such as a runaway of one signal processing unit 104, occurs within the gateway apparatus 100-A, the gateway apparatus 100-A notifies AIS (Alarm Indication Signal) to the exchange A via the AIS trunk output unit 101 according to rules defined by ITU-T recommendation G.703/704. The device alarm monitoring control unit 108 detects the occurrence of the failure and notifies information about the component, such as the signal processing unit 104, in which the failure has occurred, to the transmit CH-AIS data generating unit 109. The transmit CH-AIS data generating unit 109 then analyzes the trunk channel in which the failure has occurred based on the information about the component, such as the signal processing unit 104, in which the failure has occurred, and generates alarm information on a trunk-channel by trunk-channel basis and CH-AIS data including the alarm information. The generated CH-AIS data is assembled into CH-AIS packets by the packet assembling unit 105 and is then sent out onto the IP network via the packet transmitting/receiving unit 107. The generated CH-AIS data is thus transmitted to the other gateway apparatus 100-B.

FIG. 3 is a diagram showing the structure of a payload of each of the CH-AIS packets according to embodiment 1. As shown in the figure, the payload of each of the CH-AIS packets is so formed that AIS can be notified on a trunk-channel by trunk-channel basis. Since each trunk channel of the PSTN (A) has a one-to-one correspondence with each trunk channel of the PSTN (B), the other station disposed opposite to the gateway station 100-A, which receives the CH-AIS packets, can recognize in which trunk channel the failure has occurred, too. The CH-AIS packets are periodically transmitted to the other station disposed opposite to the gateway station 100-A.

The other gateway apparatus 100-B receives the CH-AIS packets transmitted thereto from the gateway apparatus 100-A via the packet transmitting/receiving unit 107. The CH-AIS packets received by the other gateway apparatus 100-B are disassembled by the packet disassembling unit 106 so that the received CH-AIS data analysis unit 110 can analyze the CH-AIS packets so as to determine if the alarm information represented by the packets is associated with which trunk channel of the other gateway apparatus 100-B. The analysis result is then notified to the AIS trunk output unit 101, and the AIS trunk output unit 101 notifies AIS provided on a trunk-channel by trunk-channel basis to the exchange B based on the analysis result and according to rules defined in ITU-T recommendation G.703/704.

As mentioned above, in accordance with embodiment 1, when a device alarm is raised in one of the plurality of signal processing units 104 of the gateway apparatus 100, the transmit CH-AIS data generating unit 109 generates CH-AIS data including alarm information that is generated on a trunk-channel by trunk-channel basis, the packet assembling unit 105 packetizes the generated CH-AIS data into CH-AIS packets and transmits them to another gateway apparatus 100 which is a station disposed opposite to the gateway apparatus 100 with an IP network being sandwiched between the two gateway apparatus. The other gateway apparatus 100 disposed opposite to the gateway apparatus 100 analyzes the CH-AIS packets received thereby by using the received CH-AIS data analysis unit 110, and notifies AIS provided on a trunk-channel by trunk-channel basis to the exchange of the other gateway apparatus via the AIS trunk output unit 101. Thus, the gateway apparatus 100 can notify the alarm information which is provided on a trunk-channel by trunk-channel basis to the other station disposed opposite to the gateway apparatus 100.

Embodiment 2

In a gateway apparatus 100 in accordance with embodiment 2, when a failure occurs in a PSTN interface of the gateway apparatus 100, the gateway apparatus 100 notifies alarm information provided on a trunk-channel by trunk-channel basis to another gateway apparatus which is disposed opposite to the gateway apparatus 100. The gateway apparatus 100 according to embodiment 2 has the same structure as that of embodiment 1 shown in FIG. 1.

When a failure occurs in the PSTN interface, the gateway apparatus 100 notifies AIS to an exchange via an AIS trunk output unit 101 according to rules defined by ITU-T recommendation G.703/704. An interface alarm monitoring control unit 102 then notifies information about the interface which the failure has occurred to a transmit CH-AIS data generating unit 109. The transmit CH-AIS data generating unit 109 analyzes a trunk channel corresponding to the interface in which the failure has occurred so as to generate CH-AIS packet data including alarm information provided on a trunk-channel by trunk-channel basis. The generated CH-AIS packet data is assembled into packets by a packet assembling unit 105, and the packets are sent out onto the IP network via a packet transmitting/receiving unit 107. The packets are then transmitted to the other gateway apparatus 100 which is disposed opposite to the gateway apparatus.

The other gateway apparatus 100 which is disposed opposite to the gateway apparatus receives the CH-AIS packets via the packet transmitting/receiving unit 107. The CH-AIS packets received by the other gateway apparatus 100 are disassembled by a packet disassembling unit 106. A received CH-AIS data analysis unit 110 then analyzes the disassembled CH-AIS packets so as to determine if the alarm information represented by the packets is associated with which trunk channel of the other gateway apparatus. The analysis result is then notified to an AIS trunk output unit 101, and the AIS trunk output unit 101 notifies AIS provided on a trunk-channel by trunk-channel basis to an exchange B based on the analysis result and according to rules defined by ITU-T recommendation G.703/704.

As mentioned above, in accordance with embodiment 2, when a failure occurs in the PSTN interface of the gateway apparatus 100, the transmit CH-AIS data generating unit 109 generates CH-AIS data including alarm information provided on a trunk-channel by trunk-channel basis, the packet assembling unit 105 packetizes the generated CH-AIS data into CH-AIS packets and transmits them to another gateway apparatus 100 which is a station disposed opposite to the gateway apparatus 100 with an IP network being sandwiched between the two gateway apparatus. The other gateway apparatus 100 disposed opposite to the gateway apparatus 100 analyzes the CH-AIS packets received thereby by using the received CH-AIS data analysis unit 110, and notifies AIS provided on a trunk-channel by trunk-channel basis to the exchange of the other gateway apparatus 100 via the AIS trunk output unit 101. Thus, the gateway apparatus 100 can notify the alarm information which is provided on a trunk-channel by trunk-channel basis to the other station disposed opposite to the gateway apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. A gateway apparatus configured to be disposed opposite to another gateway apparatus on an IP network and to interface between an exchange and said IP network, said gateway apparatus comprising:
   a plurality of signal processing units that are disposed for a plurality of channels thereof, respectively, each configured to perform data processing on data transmitted via a corresponding one of said plurality of channels;
   a device alarm monitoring control unit configured to monitor occurrence of a failure in said plurality of signal processing units;
   a failure-occurrence-data generating unit configured to generate failure occurrence data on a channel by channel basis including failure occurrence data about a channel corresponding to one of said plurality of signal processing units in which a failure has occurred based on failure occurrence information notified thereto by said device alarm monitoring control unit;
   a packet assembling unit configured to packetize said failure occurrence data so as to generate failure occurrence packet data;
   a packet transmitting unit configured to transmit the failure occurrence packet data generated by said packet assembling unit to said other gateway apparatus which is disposed opposite to said gateway apparatus;
   a packet receiving unit configured to receive failure occurrence packet data transmitted thereto from said other gateway apparatus which is disposed opposite to said gateway apparatus;
   a packet disassembling unit configured to disassemble the failure occurrence packet data received by said packet receiving unit so as to extract failure occurrence data;
   a failure-occurrence-data analysis unit configured to analyze the failure occurrence data extracted by said packet disassembling unit so as to determine if a channel of said other gateway apparatus in which a failure has occurred corresponds to which channel of said gateway apparatus; and
   a failure occurrence information output unit configured to notify failure occurrence information provided on a channel by channel basis to a local station side based on an analysis result obtained by said failure-occurrence-data analysis unit.

2. The gateway apparatus according to claim 1, further comprising:
   an interface alarm monitoring control unit configured to monitor occurrence of a failure in an interface with said exchange and generate failure occurrence information, and said failure-occurrence-data generating unit is configured to generate the failure occurrence data provided on a channel by channel basis based on the failure occurrence information notified thereto by said interface alarm monitoring control unit.

* * * * *